(12) United States Patent
Endo et al.

(10) Patent No.: US 6,795,063 B2
(45) Date of Patent: Sep. 21, 2004

(54) DISPLAY APPARATUS AND METHOD FOR GAMMA CORRECTION

(75) Inventors: Hiroaki Endo, Kanagawa (JP); Tetsuji Kikuchi, Kanagawa (JP); Yoshiki Shirochi, Chiba (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 09/784,514

(22) Filed: Feb. 15, 2001

(65) Prior Publication Data

US 2001/0015774 A1 Aug. 23, 2001

(30) Foreign Application Priority Data

Feb. 18, 2000 (JP) ...................................... P2000-046775

(51) Int. Cl.$^7$ .............................. G09G 5/00; G09G 3/36
(52) U.S. Cl. ............................ 345/204; 345/87; 345/89
(58) Field of Search ..................... 345/204, 85, 98–100, 345/87, 92, 89; 341/144, 150, 172; 382/167; 353/20; 315/169.3

(56) References Cited

U.S. PATENT DOCUMENTS

| | | | | |
|---|---|---|---|---|
| 4,463,380 A | * | 7/1984 | Hooks, Jr. .................. 348/580 |
| 4,783,652 A | * | 11/1988 | Lumelsky .................... 345/559 |
| 4,810,060 A | * | 3/1989 | Ukai .............................. 349/4 |
| 5,303,064 A | * | 4/1994 | Johnson et al. ............. 358/406 |
| 5,399,947 A | * | 3/1995 | Washburn .................... 315/383 |
| 5,432,567 A | * | 7/1995 | Matsuda ...................... 348/790 |
| 5,940,530 A | * | 8/1999 | Fukushima et al. .......... 382/164 |
| 6,057,816 A | * | 5/2000 | Eckersley ...................... 345/85 |
| 6,081,254 A | * | 6/2000 | Tanaka et al. ............... 382/167 |
| 6,137,904 A | * | 10/2000 | Lubin et al. ................ 382/162 |
| 6,152,566 A | * | 11/2000 | Hashizume ................... 353/20 |
| 6,297,791 B1 | * | 10/2001 | Naito et al. ................... 345/89 |
| 6,326,942 B1 | * | 12/2001 | Akimoto ....................... 345/98 |
| 6,424,331 B1 | * | 7/2002 | Ozawa ......................... 345/98 |
| 6,448,955 B1 | * | 9/2002 | Evanicky et al. ............ 345/102 |
| 6,459,449 B1 | * | 10/2002 | Juen ......................... 348/223.1 |
| 6,473,204 B1 | * | 10/2002 | Suzuki et al. ............... 358/448 |

* cited by examiner

Primary Examiner—Vijay Shankar
Assistant Examiner—Prabodh M. Dharia
(74) Attorney, Agent, or Firm—Frommer Lawrence & Haug LLP; William S. Frommer

(57) ABSTRACT

Image data of the respective colors are converted, by look-up tables in which γ correction data are stored, into gradation data that are white-balanced with intervention of the V-T characteristics of liquid crystal panels. The generated gradation data are supplied to D/A converters and the liquid crystal panels via liquid crystal driving circuits. Gamma correction data within dynamic ranges that are set for each display apparatus by measuring a luminance ratio and contrast ratios of the respective colors are written to the look-up tables in advance. As a result, all they correction data stored in the look-up tables can be used effectively. The invention is directed to such a method for generating data of look-up tables and an image display apparatus that performs gradation correction by using thus-formed look-up tables.

7 Claims, 7 Drawing Sheets

DISPLAY APPARATUS AND METHOD FOR GAMMA CORRECTION

BACKGROUND OF THE INVENTION

1. Field of the Invention

The present invention relates to an image display apparatus. In particular, the invention relates to an image display apparatus capable of producing a proper display image by using look-up tables in performing nonlinear processing such as a white balance adjustment and gamma correction in image display of displays, projectors, etc. as well as to a data generation method used in storing correction data in look-up tables.

2. Description of the Related Art

The video signal of an image of usual TV broadcast is transmitted after being subjected to γ correction so as to be suitable for the current-luminance characteristic of the CRT. Therefore, in performing image display based on such a video signal by using a display apparatus other than the CRT, it is necessary to perform gradation correction (hereinafter referred to as "γ correction") that is suitable for the electro-optical conversion characteristic of the display apparatus.

FIG. 1 is a four-quadrant diagram illustrating such γ correction that is performed for a liquid crystal panel as a display apparatus. In the case of a TV video signal, as shown in part (a) of FIG. 1, a low-level portion and a high-level portion of the original video signal is expanded and compressed, respectively, according to a (½.2)th-power curve before transmission.

Gamma correction for a video signal needs to be determined in consideration of the V-T characteristic of the liquid crystal panel so that the relationship between the original signal and the luminance on the display screen becomes linear as shown in part (b) of FIG. 1 with intervention of the V-T characteristic of the liquid crystal panel shown in part (c) of FIG. 1. Part (d) of FIG. 1 shows an example of γ correction characteristics.

A received video signal is subjected to such γ correction and a corrected signal is used as a drive signal of the liquid crystal panel.

With the above γ correction, signal processing can be performed so that the luminance of the liquid crystal panel properly reflects the level of an original video signal and hence the contrast of an original image can be reproduced correctly.

Also in the case of a color image, by performing such γ correction for each of the three primary colors, the hue of an original image can be reproduced faithfully and color temperature setting and a white balance adjustment can be attained by adjusting γ correction values.

In the case of the liquid crystal display panel, the γ correction assumes a nonlinear, S-shaped curve, which can be approximated by using a polygonal line circuit in the case of an analog signal.

However, in recent years, for more faithful gradation expression, signal processing shown in FIG. 2, for example, has come to be employed in which digital signals of γ-corrected gradations are read out by supplying 8-bit digital color video signals of R (red), G (green), and B (blue) (in the case of analog input signals, they are digitized in advance by A/D converters) to look-up tables (memories) 11R, 11G, and 11B in which γ correction data of the respective colors are stored in advance, the read-out digital signals are converted into analog signals by D/A converters 12R, 12G, and 12B, and the analog signals are supplied as drive signals to liquid crystal panels 14R, 14G, and 14B of the respective colors via liquid crystal driving circuits 13R, 13G, and 13B.

FIG. 3 shows an example of γ correction performed by such a signal processing circuit. In FIG. 3, curves γR, γG, and γB of γ correction data that are stored in advance allow readout of output data (vertical axis) for gradation data of 8 bits (0–256) of video signals that are input to the look-up tables. As a result, for gradation levels of transmission-side γ-corrected color signals, this γ correction enables output of corrected signals with intervention of V-T drive characteristic curves VTr, VTg, and VTb of the liquid crystal panels.

A white balance adjustment is performed finally. Where only amplitude and offset adjustments are performed by the digital signal processing of the look-up tables, to reproduce white by γ-corrected signals of the respective colors by compensating for optical variations of the liquid crystal panels, the ranges of signals are restricted. Therefore, unnecessary signal ranges of the respective colors are eliminated. As shown in FIG. 3, usable γ-corrected output signal ranges of R, G, and B after the white balance adjustment are 20–100%, 8–80%, and 0–95%, respectively.

That is, only parts, in ranges Ra, Ga, and Ba, of the γ correction curve data stored in the look-up tables are effectively used as γ correction data and the other data are not used.

In particular, in the case of the transmission-type liquid crystal panels, the contrast ratio of B is lower than the contrast ratios of the other colors. For example, in general, the contrast ratios of R and G on the liquid crystal panels are about 600:1 and about 500:1, for example. However, in the case of B, even in a case where the maximum drive voltage is applied, the light attenuation factor is low and there remains light that passes through the panel (leakage light). Therefore, the contrast ratio of B is as small as about 400:1. As a result, the screen becomes bluish in a black range.

In view of the above, it is necessary to obtain proper white balance in a black-level-elevated state by adding the other colors to blue of minimum luminance. If the dynamic ranges of the other colors are so set equal to the dynamic range of B, as shown in FIG. 3 the upper limit and the lower limit portions of drive voltages of R and G go out of the usable ranges after the white balance adjustment.

That is, the usable ranges after the white balance adjustment are defined by the maximum values and minimum values that provide a constant luminance ratio of R, G, and B that is R:G:B=22:68:10, for example. Upper limits are determined by a white-side luminance ratio of R, G, and B. Black-side usable ranges of the respective colors are determined by a black-side luminance ratio of R, G, and B, that is, (white-side luminance ratio)×{1/(contrast of each color)}.

As described above, in the conventional γ correction method, not all of correction data of look-up tables that are stored in advance and conform to the V-T characteristics of the liquid crystal panels are used effectively; that is, the amount of data of the look-up tables that are used effectively is reduced. This results in a problem that the gradations of correction data unavoidably become coarse.

In the case of B, in particular, although the γ characteristic varies steeply in a dark gradation range, output γ-corrected values in this range have coarse gradations. This means a problem that a white balance adjustment cannot be performed closely in this dark range.

SUMMARY OF THE INVENTION

The present invention has been made in view of the above problems. According to a first aspect of the invention, there is provided an image display apparatus comprising look-up tables in which γ correction data for color signals are stored, D/A converters for converting color image data that are read out from the look-up tables into analog signals, respectively, driving means for generating drive signals based on the analog signals, and optical modulating means for displaying a color image based on the drive signals, wherein γ correction data that attain proper white balance in dynamic ranges that can be used for display are stored in the look-up tables, and wherein the amplitudes and offsets of drive signals in such ranges as not to be corrected by the look-up tables are adjusted by signal transmission characteristics of an analog system.

According to a second aspect of the invention, there is provided a gradation correction data generation method for an image display apparatus comprising look-up tables in which γ correction data for color signals are stored, D/A converters for converting color image data that are read out from the look-up tables into analog signals, respectively, driving means for generating drive signals based on the analog signals, and optical modulating means for displaying a color image based on the drive signals, the gradation correction data generation method comprising the steps of, in a white balance adjustment and a γ adjustment, setting dynamic ranges that can be used for display by measuring a luminance ratio and contrast ratios for the color signals, and performing a gain adjustment and an offset adjustment after D/A conversion in such a manner that they are suitable for the dynamic ranges; and re-calculating new γ correction data of the look-up tables so that the new γ correction data have the dynamic ranges as full ranges, and substituting the new γ correction data for the previous γ correction data of the look-up tables, whereby γ correction data within the dynamic ranges can be used effectively in the white balance adjustment that is performed on digital data.

As described above, in the invention, to make such settings that all the digital data stored in the look-up tables are used effectively in digitally performing such adjustments as γ correction and a white balance adjustment by the look-up tables, offsets and dynamic ranges are compensated by subsequent analog circuits. Therefore, the adjustments can be performed by using finer luminance levels than in the conventional case even if memories having the same capacities as in the conventional case are used for storing γ correction data.

DETAILED DESCRIPTION OF THE PREFERRED EMBODIMENT

Figure 1:
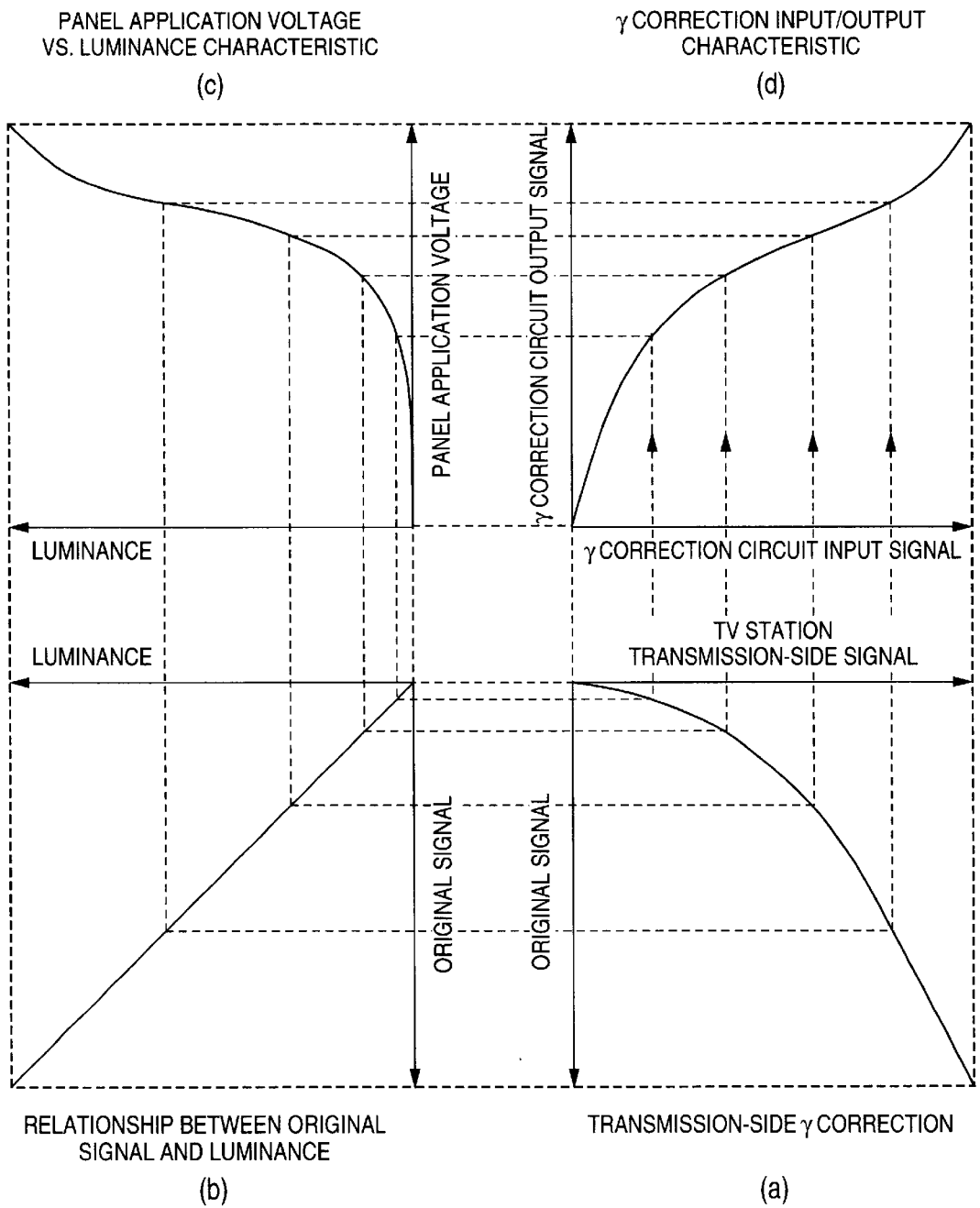
FIG. 1 illustrates a γ characteristic for a video signal.
Figure 2:
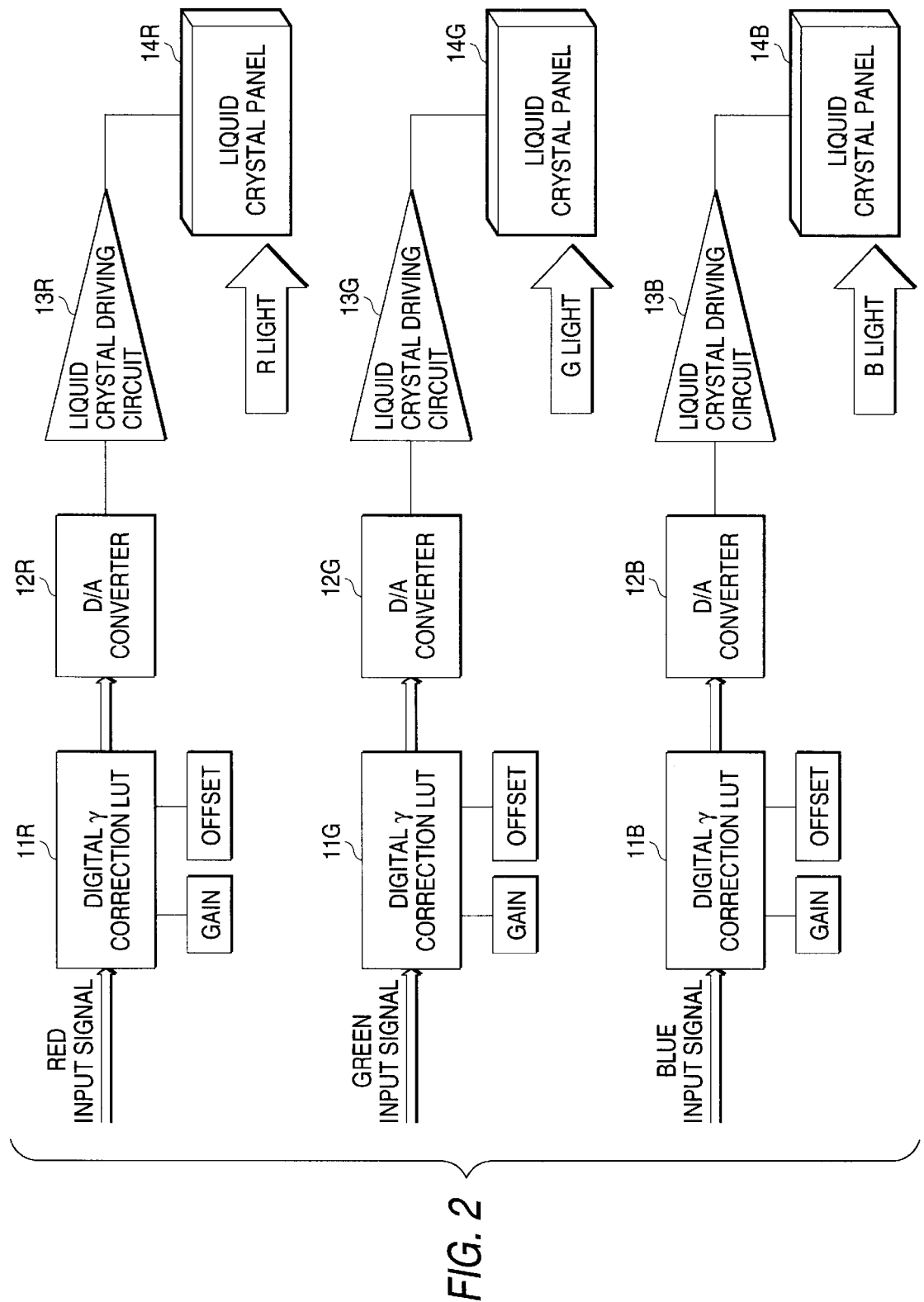
FIG. 2 is a block diagram illustrating how γ correction is performed by using look-up tables.
Figure 3:
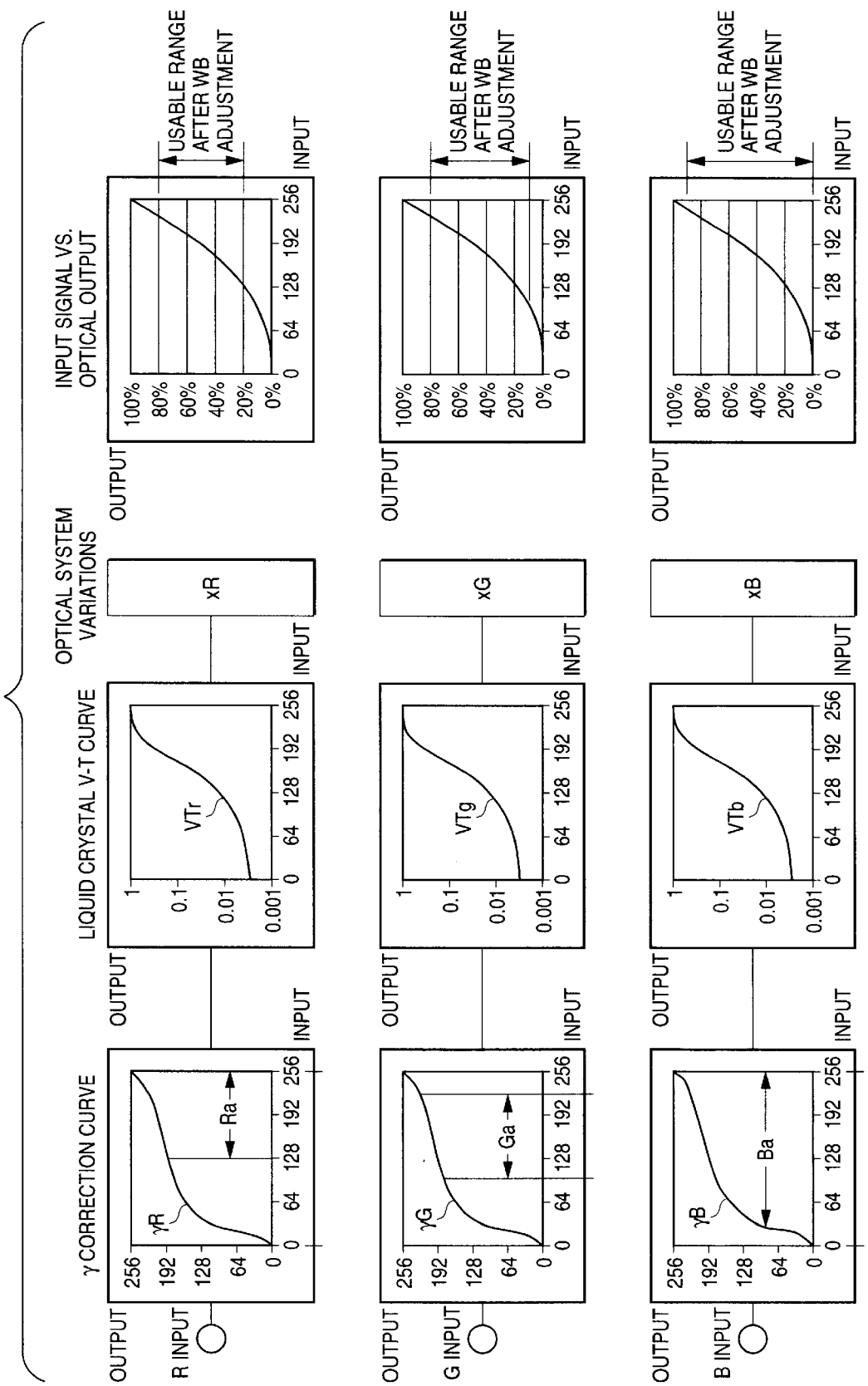
FIG. 3 shows an example of conventional γ correction.
Figure 4:
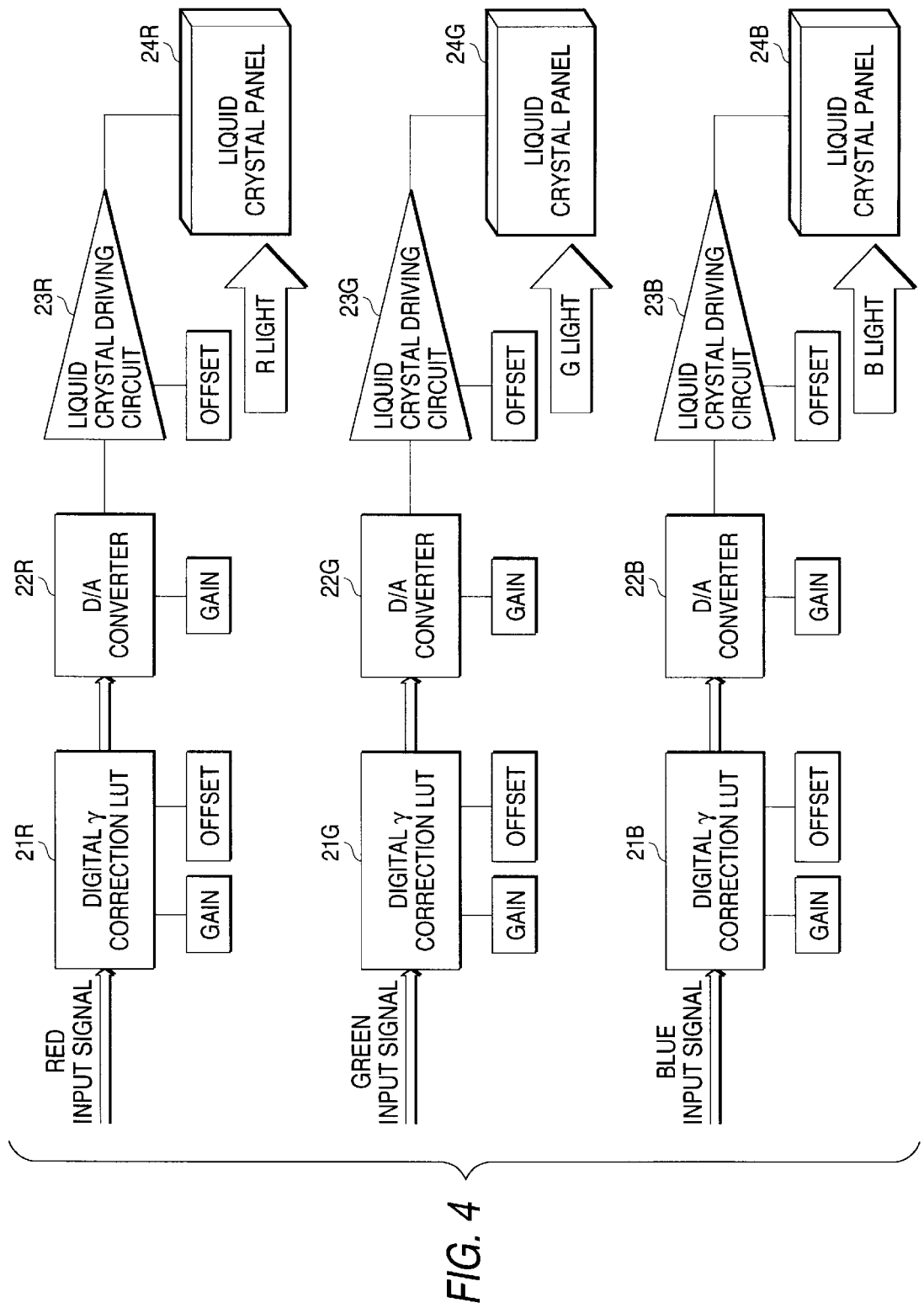
FIG. 4 is a block diagram including γ correction look-up tables and liquid crystal driving circuits according to the invention.

FIG. 4 is a block diagram outlining how signal processing of γ correction and a white balance adjustment are performed to obtain color drive signals to be supplied to display sections.

It is assumed that color video input signals of red (R), green (G), and blue (B) that are supplied from a video source (not shown in FIG. 4) are image data that are digital signals of 8-bit gradation, for example, obtained by A/D conversion.

The image data of the respective colors are supplied to respective look-up tables 21R, 21G, and 21B in which data to produce white-balanced signals are stored. The look-up tables 21R, 21G, and 21B convert the image data into data having gradation levels that provide proper white balance with intervention of the V-T characteristics of liquid crystal panels as the display sections.

The look-up tables 21R, 21G, and 21B are memories (e.g., EPROMS) that produce an output of 10 bits, for example. The data of the look-up tables 21R, 21G, and 21B can be rewritten externally, and rewritten data are held by the look-up tables 21R, 21G, and 21B.

Data that are read out from the look-up tables 21R, 21G, and 21B are supplied to D/A converters 22R, 22G, and 22B, where they are converted into analog signals. The analog signals are supplied to the liquid crystal panels 24R, 24G, and 24B via liquid crystal driving circuits 23R, 23G, and 23B.

Where the display apparatus is a projector, the liquid crystal panels 24R, 24G, and 24B modulate light beams emitted from a halogen lamp or the like in accordance with video signals and are usually normally-white type light valves in which when a voltage is applied to a certain pixel, the quantity of light passing through the pixel decreases in accordance with the voltage value.

Each of the D/A converters 22R, 22G, and 22B is configured in such a manner that the output step width of 1 bit varies when a reference voltage supplied is varied by a control section (not shown). As a result, each of the D/A converters 22R, 22G, and 22B has a gain setting means capable of converting the amplitude of a signal indicated by input data (i.e., data that is input to the D/A converter) at a prescribed gain. Each of the liquid crystal driving circuits 23R, 23G, and 23B also has an offset setting means for varying the offset level by superimposing a DC component to a signal voltage value to be output.

Next, a description will be made of a process of writing data to the look-up tables so that with the above-described signal processing blocks a white-balance-adjusted image is displayed by light beams that have passed through the liquid crystal panels after execution of the γ correction for each color.

Figure 5:
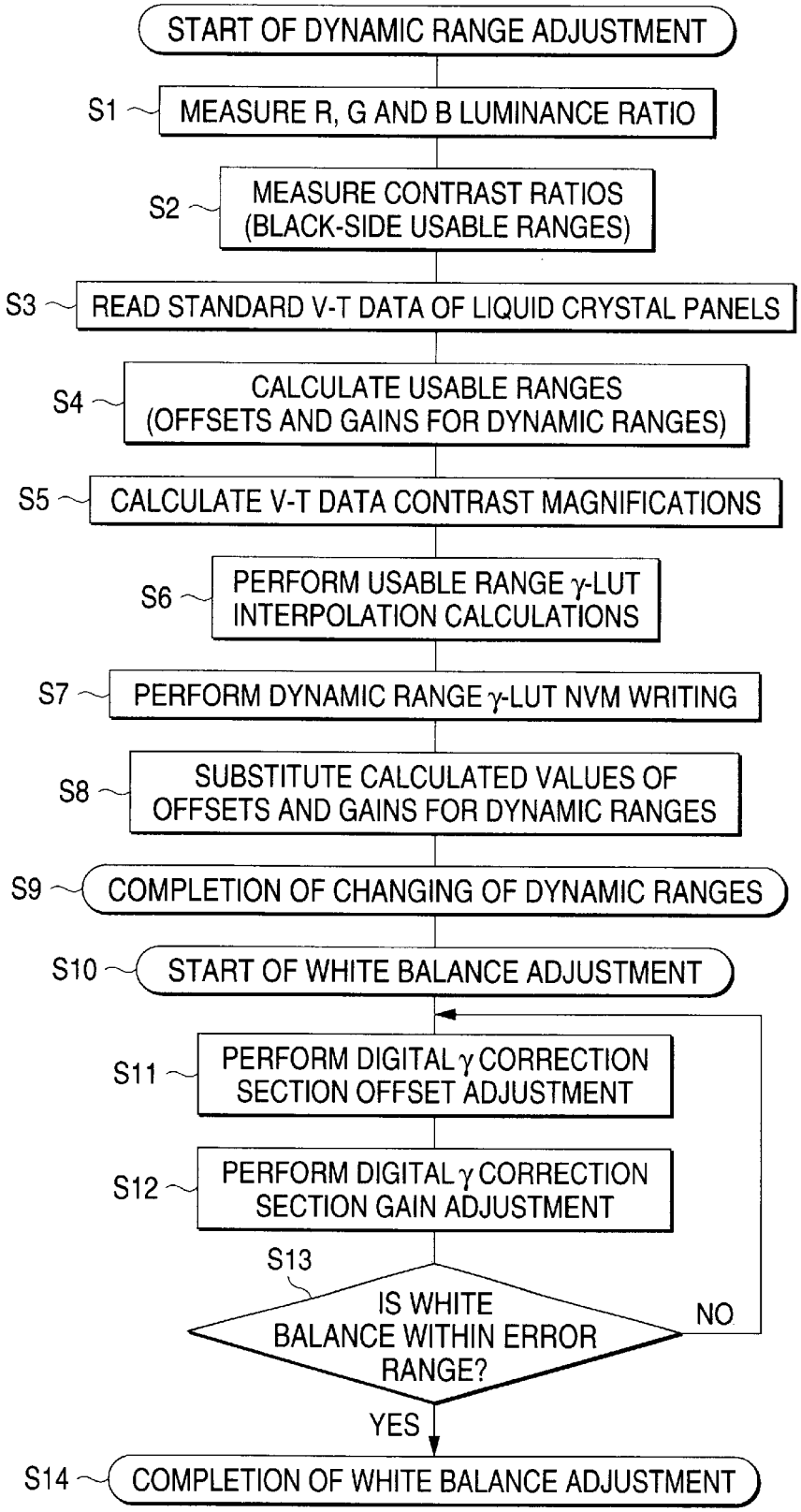
FIG. 5 is a flowchart showing how data to be stored in the look-up tables are generated.
Figure 6:
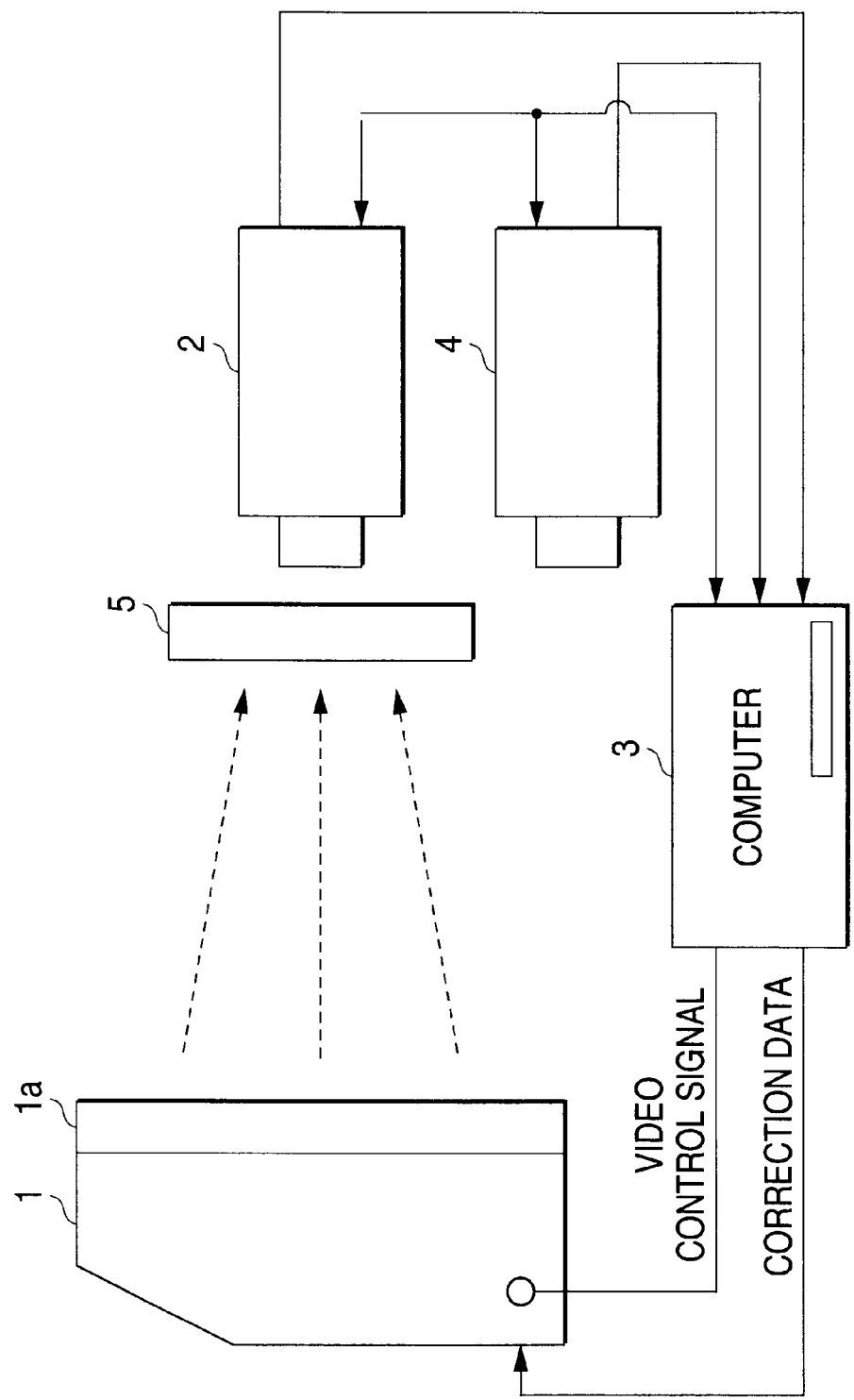
FIG. 6 illustrates how various kinds of information are measured from the screen of a display apparatus.

FIG. 5 is a flowchart showing a method for writing data to look-up tables and a white balance adjustment method that are used in the image display apparatus according to the invention. FIG. 6 outlines instruments for measuring luminance, contrast, etc. of each displayed color in which the video display screen is the screen of a rear projector, for example.

A measuring method is as follows. An image on a screen 1a (video display screen) of a liquid crystal projector (rear projector), for example, as an apparatus 1 to be measured is measured with a luminance meter 2 and a colorimeter 4 in combination with replaceable filters 5 of R, G, and B. Resulting luminance data and color difference data of each color are captured by a computer 3 that is composed of a CPU, a memory, a display section, peripheral devices, interfaces, etc.

In measuring luminance of R, G, or B, the filter 5 of R, G, or B is placed in front of the incidence lens of the luminance meter 2. The filters 5 are not used in a measurement with the colorimeter 4.

Depending on the content of measurement, the computer 3 supplies a reference measurement image signal (e.g., a flat pattern signal of R, G, B, or black) to the video input terminal of the liquid crystal projector 1 and causes the liquid crystal projector 1 to display a prescribed image. As described later, γ correction data that have been newly calculated based on measurement results are written to the look-up tables of the liquid crystal projector 1.

A data generation method is as follows. First, at step S1, flat field images of R, G, and B corresponding to maximum digital γ correction values are displayed by using a signal source that is provided in a digital gamma correction section (IC) and luminance of each color is measured.

At step S2, flat field images of R, G, and B corresponding to minimum digital γ correction values are displayed by using the signal source that is provided in the digital gamma correction section and luminance of each color is measured. Contrast ratios of the respective colors are obtained by calculating ratios between the luminance values obtained at step S1 and those obtained at this step.

At step S3, data of standard V-T characteristics (curves) of the respective colors of the liquid crystal panels are captured by the computer 3. At step S4, ranges where the luminance ratio among the three colors is kept constant, that is, white balance is maintained, are determined based on the above-calculated contrast ratios and the standard V-T characteristic data. Offsets and gains for these usable ranges (dynamic ranges) are calculated. Gains of the D/A converters 22R, 22G, and 22B and offsets of the liquid crystal driving circuits 23R, 23G, and 23B (see FIG. 4) are so set as to conform to the dynamic ranges thus calculated.

At step S5, contrast magnifications are calculated based on the standard V-T characteristics and V-T characteristic data are converted so that the contrast ratios of R, G, and B become identical.

At step S6, usable ranges of the look-up tables are determined based on the offsets and the gains of the respective colors and calculations are performed so that the γ correction data in the usable ranges are converted into new γ correction data that occupy the entire dynamic ranges of the respective look-up tables.

At step S7, the new γ correction data are supplied from the computer 3 to the look-up tables that are incorporated in the liquid crystal projector 1 and data rewriting is performed. The dynamic range changing process is finished here.

Steps S10–S14 are white balance adjustment steps that are also executed in the prior art and that are executed in the invention after rewriting of the data of the look-up tables.

At step S11, a white balance adjustment signal (e.g., a flat field signal) of an IRE 30% level is supplied from the computer 3 to the liquid crystal projector 1. An image on the liquid crystal projector 1 is measured with a colorimeter 4 and the offsets of the digital gamma correction section are adjusted so that the white balance values have prescribed values.

At step S12 a white balance adjustment signal (e.g., a flat field signal) of an IRE 70% level is supplied from the computer 3 to the liquid crystal projector 1. An image on the liquid crystal projector 1 is measured with a colorimeter 4 and the gains of the digital gamma correction section are adjusted so that the white balance values have prescribed values.

At step S13, it is judged whether the white balance of each of images displayed while white balance adjustment signals of IRE 30% and 70% levels are supplied is within a prescribed error range. If the white balance is not within the prescribed error range, steps S11 and S12 are executed again. If the white balance is within the prescribed error range, the adjustment is finished and a transition is made to step S14.

If the γ correction data of the look-up tables of the liquid crystal projector 1 have been rewritten by execution of steps S1–S9, all of the stored correction data are data that are usable in the entire dynamic ranges of input signals. The accuracy per bit of correction data can be made higher than in the conventional case even if the memory capacities of the look-up tables are the same.

The above-described block diagram of FIG. 4 shows the gradation correction driving circuits of the display apparatus according to the invention in which the data of the look-up tables have been rewritten in the above-described manner.

In the invention, in the white balance adjustment and the γ adjustment, dynamic ranges that can be used for display are determined first by measuring a luminance ratio and contrast ratios and gains and offsets for analog signals obtained by D/A conversion are determined thereafter so as to conform to the dynamic ranges.

In the case of FIG. 4, the gains and the offsets of the respective colors are adjusted by the D/A converters 22R, 22G, and 22B and the liquid crystal driving circuits 23R, 23G, and 23B, respectively. However, the invention is not limited to such a circuit configuration.

Figure 7:
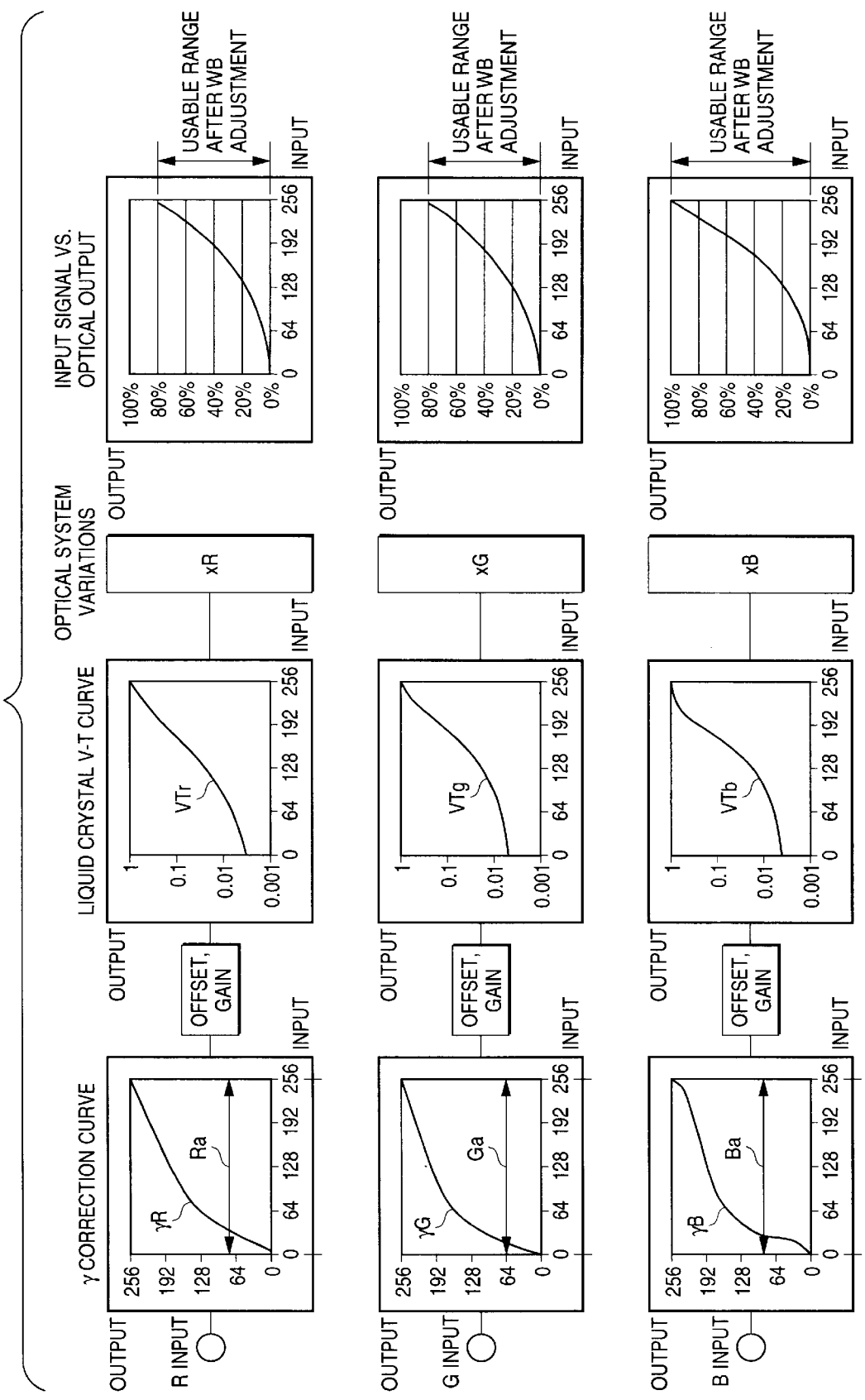
FIG. 7 shows a signal conversion process according to the invention.

FIG. 7 shows examples of γ correction characteristics and V-T characteristics of the respective colors that are used in a case where the gradation correction is performed by the circuit configuration of FIG. 4.

In FIG. 7, an R input, a G input, and a B input of digitized image data are converted into prescribed image data according to curves γR, γG, and γB of the γ correction data that are stored in the look-up tables 21R, 21G, and 21B, respectively. The resulting image data are gain-adjusted by the D/A converters 22R, 22G, and 22B and then offset-adjusted by the liquid crystal driving circuits 23R, 23G, and 23B.

Gamma correction data to be written to the look-up tables 21R, 21G, and 21B have been generated by the process of FIG. 5 as correction data all of which are within dynamic ranges of the respective colors that are necessary for attaining proper white balance. Outputs (drive signals) produced as a result of the correction according to such correction data are gain/offset-adjusted in the form of analog signals and then supplied to the liquid crystal panels 24R, 24G, and 24B.

By driving the liquid crystal panels 24R, 24G, and 24B by using such drive signals, images of the three colors that have been white-balanced according to the V-T curves are projected onto the screen or the like.

Therefore, the usable output ranges after the white balance adjustment are wider than that of being obtained by conventional γ correction data that are stored in advance and the data can be used effectively in the ranges Ra, Ga, and Ba of the γ correction curves γR, γG, and γB.

As described above, in the invention, dynamic ranges of the respective colors that can be used for display are determined first for each display apparatus by measuring a luminance ratio, contrast ratios of the respective colors, etc. with a luminance meter and a colorimeter and then the gain adjustment of the D/A converters and the offset adjustment of the liquid crystal driving circuits are performed in such a manner as to be suitable for the thus-determined dynamic ranges. Since γ correction data within the thus-determined dynamic ranges are written to the look-up tables, all the γ correction data can be used effectively, which enable a more correct white balance adjustment by an increased data amount.

In particular, the invention makes it possible to output a γ correction value of B with high accuracy (i.e., with a larger number of bits) in a black balance adjustment in which images are displayed at low luminance.

As described above, in the invention, in performing image display by using devices having nonlinear signal-luminance characteristics as in the case of liquid crystal panels or the like, dynamic ranges corrected by the γ adjustment and the white balance adjustment on digital data are set by the gain adjustment and the offset-adjustment by the analog circuits. Therefore, where the correction on digital data is performed by look-up tables, all the correction data can be used effectively. This provides an advantage that the capacities of memories for the correction can be made smaller than in the conventional case.

Where look-up tables having the same memory capacities as in the conventional case are used, the bit accuracy of necessary color correction values can be increased and the correction characteristics are made even smoother. This provides an advantage that color imbalance that is prone to occur particularly in a dark range can be compensated for with increased accuracy.

What is claimed is:

1. An image display apparatus comprising:
    a plurality of look-up tables in which γ correction data for a plurality of color signals is stored, said γ correction data converts each of its respective color signals into white-balanced digital color image data, wherein each digital color image data is within a maximum dynamic range that is usable for displaying the digital color image data, said maximum dynamic range is defined in accordance with contrast ratios, said contrast ratios are calculated based upon measured luminance for displayed maximum and minimum γ correction values for each color signal and said color ratios of said each digital color image are constant and based on voltage-transmission (V-T) characteristics of said respective color signals of liquid crystal panels and further based on availability of said dynamic range of each said digital color;
    a plurality of D/A converters for converting each digital color image data into an analog signal;
    a plurality of driving means for generating drive signals in accordance with its respective analog signal;
    optical modulating means for displaying a color image based on the drive signals; and
    calculating means for calculating and setting offsets of a liquid crystal driving circuit of said respective color signals and gains of said plurality of D/A converters of said respective color signals based on said dynamic range of said each digital color image.

2. The image display apparatus according to claim 1, wherein the color signals are color signals of three primary colors of red, green, and blue, and wherein the optical modulating means is three liquid crystal panels corresponding to red, green, and blue.

3. The image display apparatus according to claim 2, wherein the liquid crystal panels are of a normally-white, transmission type.

4. The image display apparatus according to claim 1, wherein a
    white balance adjustment means determines if a white balance signal of IRE 30% and a white balance signal of IRE 70% are within a predetermined error range.

5. A gradation correction data generation method for an image display apparatus comprising a plurality of look-up tables in which γ correction data for a plurality of color signals is stored, said γ correction data converts each of its respective color signals into white-balanced digital color image data, wherein each digital color image data is within a maximum dynamic range that is usable for displaying the digital color image data, said maximum dynamic range is defined in accordance with contrast ratios, said contrast ratios are calculated based upon measured luminance for displayed maximum and minimum γ correction values for each color signal and said color ratios of said each digital color image are constant and based on voltage-transmission (V-T) characteristics of said respective color signals of liquid crystal panels and further based on availability of said dynamic range of each said digital color, a plurality of D/A converters for converting each digital color image data into an analog signal, a plurality of driving means for generating drive signals in accordance with its respective analog signal, and optical modulating means for displaying a color image based on the drive signals, the gradation correction data generation method comprising the steps of:
    in a white balance adjustment and a γ adjustment, setting dynamic ranges that can be used for display by measuring a luminance ratio and contrast ratios for the color signals;
    calculating and setting offsets of a liquid crystal driving circuit of said respective color signals and gains of said plurality of D/A converters of said respective color signals based on said dynamic range of said each digital color image; and
    re-calculating new γ correction data of the look-up tables so that the new γ correction data have the dynamic ranges as full ranges, and substituting the new γ correction data for the previous γ correction data of the look-up tables,
    whereby γ correction data within the dynamic ranges can be used effectively in the white balance adjustment that is performed on digital data.

6. The gradation correction data generation method according to claim 5, wherein the color signals are color signals of three primary colors of red, green, and blue, and wherein the optical modulating means is three liquid crystal panels corresponding to red, green, and blue.

7. The gradation correction data generation method according to claim 4, wherein a white balance adjustment means determines if a white balance signal of IRE 30% and a white balance signal of IRE 70% are within a predetermined error range.

* * * * *